Nov. 19, 1935. W. W. MOREY 2,021,151
SCALE MECHANISM
Filed Sept. 28, 1932 2 Sheets-Sheet 1

INVENTOR
WALTER W. MOREY
BY *J. H. B. Whitfield*
ATTORNEY

Nov. 19, 1935. W. W. MOREY 2,021,151
SCALE MECHANISM
Filed Sept. 23, 1932 2 Sheets-Sheet 2
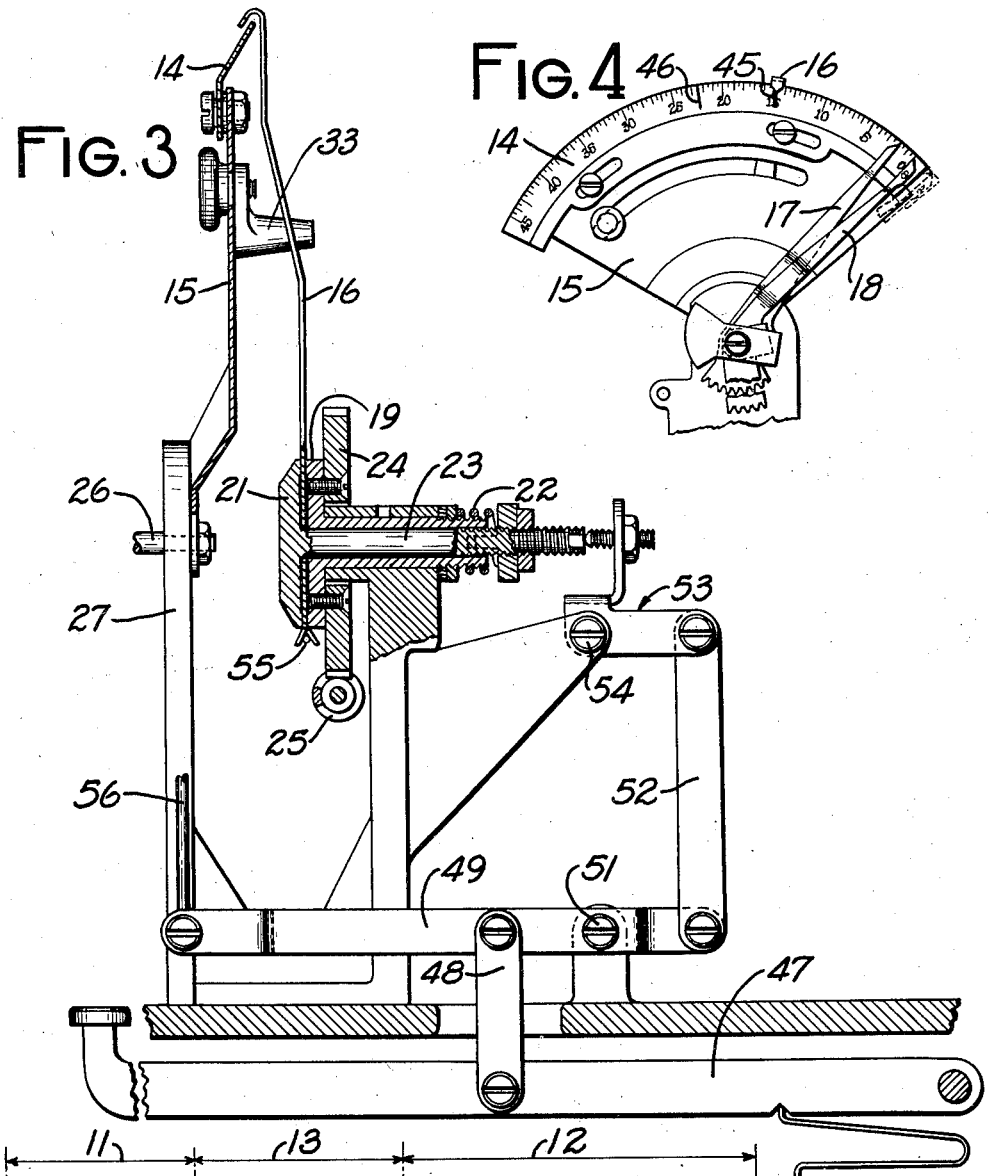
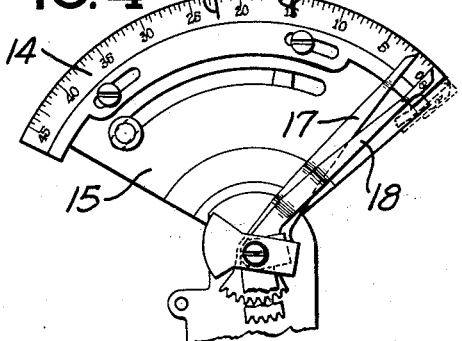
INVENTOR
WALTER W. MOREY
BY
ATTORNEY Patented Nov. 19, 1935

2,021,151

UNITED STATES PATENT OFFICE 2,021,151

SCALE MECHANISM

Walter W. Morey, Wilmette, Ill., assignor, by mesne assignments, to Teletypesetter Corporation, Chicago, Ill., a corporation of Delaware Application September 28, 1932, Serial No. 635,183

18 Claims. (Cl. 164—112)

This invention relates to type-setting systems and apparatus and especially to perforators and counters which may be utilized for preparing a perforated tape for automatic control of composing machines of the line-casting type.

The primary object of the present invention is to provide a simple, rapid and efficient means for composing tabular matter with machines of the line-casting type.

Another object of the invention is the provision of a structure which materially facilitates and expedites the perforation of control strips representative of matter including tabular portions to be later composed by line-casting machines.

A further object of this invention is the provision of an indicating mechanism adaptable for tabular work by providing means for changing the zero position of the scale and thus insuring the perfect vertical alignment of columnar or tabular work.

To achieve the foregoing and other objects of the invention indicating mechanisms of the keyboard perforators and counters according to co-pending applications Serial No. 601,172 filed March 25, 1932 by H. L. Krum et al. and Serial No. 613,706 filed May 26, 1932 by H. L. Krum have been modified to cause the scale to move in response to the minimum space band pointer, which will change the zero position of the scale with the addition of each space band in the line. Briefly, the indicating mechanism, to which the present invention is particularly adaptable, comprises a matrix pointer and a pair of spaceband pointers which are relatively movable with respect to a sectoral or fan-shaped dial. The matrix pointer responds to the operation of the character keys and is movable incrementally in variable amounts representative of matrix widths and functions to indicate on the scale the totalized widths of the matrices in the composed line. The spaceband pointers respond to the operation of a space key and for each effectiveness thereof are operated differentially or in proportionate amounts, such that one of the pair of pointers, which is herein identified as the maximum spaceband pointer, is moved an amount representative of the maximum thickness of a spaceband. The other of the pair, herein identified as the minimum spaceband pointer, is moved an amount representative of the minimum thickness of a spaceband. The space between the two spaceband pointers is representative of the spread or expansibility of the spaceband. The effect of this operation of the spaceband pointers is cumulative; that is, for each operation of the space key the spaceband pointers are moved differentially an additional amount representative of the minimum and maximum thicknesses of one spaceband to effect the summation of successive spaceband thicknesses to indicate in turn by the space between the pair of pointers the cumulative expansibility of the composed line. To render the indicating mechanism readily adaptable for tabular work it is proposed to connect the scale with the minimum spaceband pointer so that, as will hereinafter become apparent, the zero position of the scale will be advanced in response to each operation of the space key, such that the normal zero point or position of justifiability will be changed.

A better understanding of the invention may be had from the following description taken in conjunction with the accompanying drawings wherein:—

Fig. 3 is a vertical cross-sectional view of the indicating mechanism.

Fig. 4 is a front elevational view showing the indicating mechanism in one of its operative positions.

Fig. 5 illustrates a portion of a stock table to show the arrangement of the tabulated matter.

Figure 1:
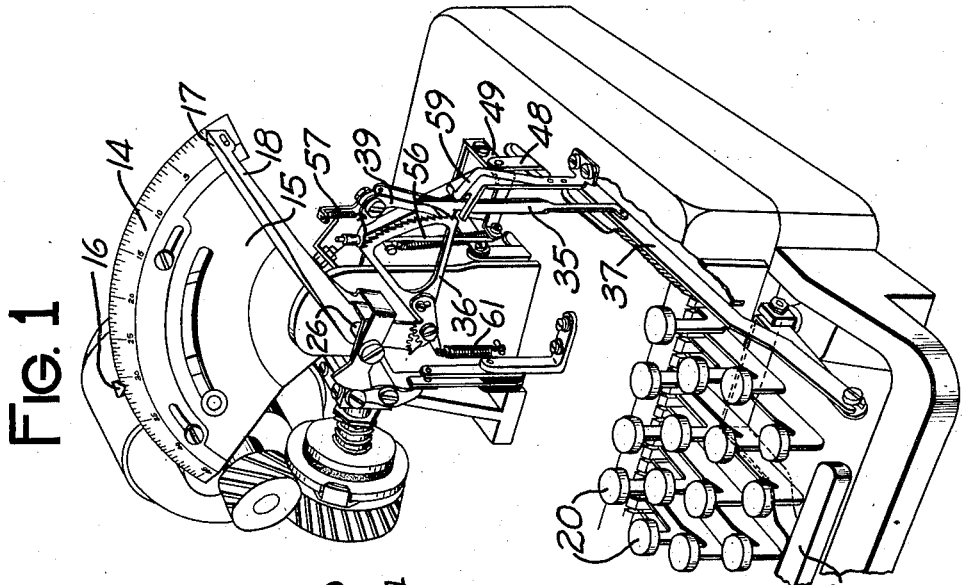
Fig. 1 is a fragmentary perspective view of a keyboard device employing the indicator of the present invention.

As is commonly known in the typographical art, the slugs or lines of type produced by composing machines of the line-casting type are made through the instrumentality of matrices which consist of small brass units carrying indented characters in their edges and which are of different thicknesses due to the fact that the characters vary in width. Thus, when these matrices are assembled into a line of predetermined definite length, the number of matrices necessary to complete the line varies with the particular matrices used. The length of the line, therefore, is dependent upon the thickness of the characters or matrices composing the line and not merely upon the number of characters included in the line. Hence, it is necessary during the preparation of a perforated strip representing lines of composed matter for the production of the slugs or lines of type to totalize the various thicknesses of matrices corresponding to the code perforations made in the strip, so that the operator will be apprised of the length of the line remaining as each key is operated and can thus judge the justifiability of the line.

Cooperating with the character matrices and equally determinative of the justifiability of the line are the justifying matrices, spacers commonly known as expansible spacebands or word spacers which comprise a portion, known as the sleeve, analogous to and having the contour of a character matrix and which is positioned in the line of matrices usually between each series of character matrices comprising a word. The sleeve has slidably connected thereto and depending therefrom a wedge-shaped portion, by means of which the spacers or spacebands are adjusted between certain ranges of thickness before the casting operation is performed. Incidentally, the thickness of the sleeve portion determines substantially the minimum thickness of the spaceband. It is essential, therefore, that the indicator take cognizance of the expansibility of the spacebands as well as the totalization of the character matrices and that these two functions be performed simultaneously and the net or resultant effect be apparent to the operator at all times.

In addition to the expansible spacebands or word spacers, line-casting machines, as is well known, are also provided with non-expansible word spacers of fixed thicknesses such as the em quads, en quads and the thin spaces; the en quads, for example, being of one-half the thickness of the em quad and the thin spaces being of one-third the thickness of the em quad. Furthermore, the matrices carrying the numerical characters, except fractions, are all of the same thickness and are equal in thickness to the en quad. The matrices carrying the fractions are equal in thickness to either the em quad or en quad depending on the particular font of type used, but in each font of type the "fractions" matrices are of one thickness. Therefore, in setting up tabular work, in which the tabulated portions must necessarily be in vertical alignment, it is obvious that the numerical matrices composing the tabulated matter being of uniform thickness irrespective of the particular digit carried thereon can be readily and properly placed in the line to insure this vertical alignment.

In the present disclosure the familiar stock tables have been chosen to illustrate the application of the present invention in preparing tabulated matter. In the illustration shown in Fig. 5, two portions; namely, 11 and 12, are allotted for tabular matter. The intermediate portion 13 comprises the item or name of the security or stock. In the portions 11 and 12, no spacebands are used, these portions being made up entirely of matrices of fixed thicknesses; namely, the matrices carrying numerical characters, and the em and/or en quads. Therefore, the spacebands are introduced into the line only in the intermediate portion 13 so that in the process of justification, wherein the spacebands are expanded to spread the line, the tabulated portions 11 and 12 will be forced to the left and right, respectively; and since the spaces therein are constant, the columns should be in perfect vertical alignment.

Heretofore, the process of composing matter of the nature illustrated in Fig. 5 has been difficult and has entailed great care and accuracy on the part of the operator or compositor who has had to determine mentally the point at which the tabulation was to begin, because no means was available for automatically totalizing the combined thicknesses of matrices and spaceband sleeves. The problem of readily and expeditiously composing tabulated matter has been met by the present invention wherein a scale has been provided which facilitates tabular work as will become evident from the following description.

In the specific embodiment herein described, the present invention is shown in connection with the indicating device disclosed in the aforementioned copending applications. The indicating mechanism therein described comprises a sectoral or fan-shaped dial 15 (Figs. 1 and 2) relatively movable to which are an index hand or matrix pointer 16 and a pair of spaceband pointers 17 and 18. The matrix pointer 16 is rendered variably movable along the arcuate edge of a scale 14 of dial 15 by means of a counting mechanism which is variably operated in accordance with the widths of the characters composed in the line, and which may be of the construction shown and described in either of the copending applications. Briefly, the operation of the counting mechanism is controlled by a series of keys 20, Fig. 1, arranged similarly to the familiar typewriter keyboard, through the instrumentality of a selector mechanism contained within the base of the keyboard device.

Referring to Fig. 3, the matrix pointer 16 is shown as disposed between a flanged member 19 and annular member 21, and as described in said copending applications the matrix pointer 16 is rendered movable with the flange member 19 by reason of the pressure imparted thereon by a spring 22 through the instrumentality of a rod 23 and member 21. Gear 24 secured to the flange member 19 is in mesh with a pinion 25, the rotation of which is variably controlled by the counting mechanism described in said copending applications, and the rotation thereof in varying amounts is transmitted through gear 24 to the matrix pointer 16.

Figure 2:
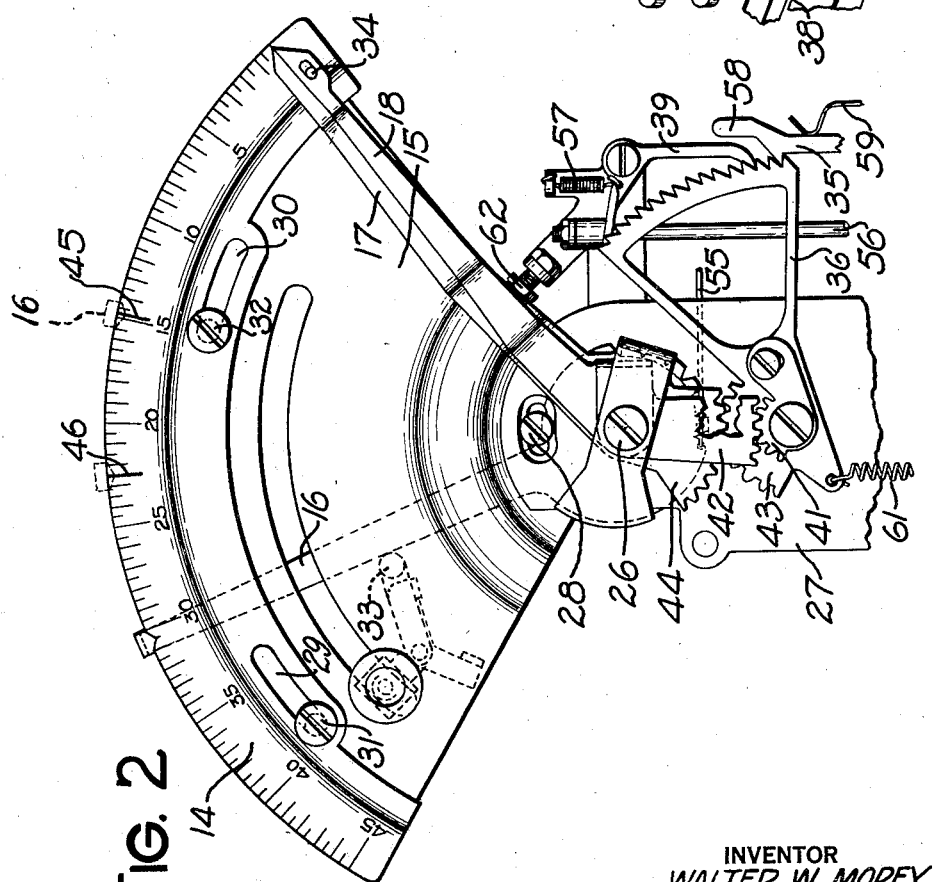
Fig. 2 is a front elevational view of the indicating mechanism.

As shown in Fig. 2, the dial 15 which is pivotally mounted at 26 to bracket 27 and is adjustably set through slot and screw adjustment 28, has slidably mounted along its outer edge, by means of slots 29 and 30 coacting with stud screws 31 and 32, respectively, the movable scale 14. The length of slots 29 and 30 is determined by the number of spacebands normally insertable in a line of composed matter, and has been established for all practical purposes to provide for the movement of the spaceband pointers a distance representative of ten spacebands. Scale 14 is provided along its arcuate edge with a series of graduations, which in the present embodiment of the invention represent keyboard "ems" or units of type measure, and is adapted to count proportions, and not actual dimensions; thus rendering the apparatus adaptable for use with any size or font of type, provided only that the characters in the various fonts have the same unit groupings, as set forth in the aforementioned applications. It is, of course, understood that the graduations may also represent unit widths of characters employed in page printing machines without departing from the scope of the invention. The length of line to be composed is predetermined and is represented by the distance between pointer 16, when it abuts adjustable stop 33 (Fig. 2), and the zero position on the scale. Thus, the adjustable stop 33 and the zero position on the scale cooperate to define the range of movement of the matrix pointer 16. The reverted end of the matrix pointer 16 moves along the edge of the scale from left to right towards zero in response to the totalization or accumulation of the matrix or character thicknesses by the counting mechanism. Thus, the distance from the pointer 16 to zero at any instant indicates the amount of space left in the line to be filled, when the line contains no spacebands. Normally, however, when spacebands are inserted in the line the space remaining to be filled varies with the number of spacebands inserted or introduced in the line. So, to indicate the justifiability of the composed line, the pair of pointers 17 and 18 are provided, the distance between the pointers indicating the cumulative amount of expansibility of the spacebands.

In the case of a fixed scale as disclosed in the aforementioned copending applications, the distance from the zero position on the scale to the nearest pointer represents the sum of the thin ends or sleeves of all the spacebands (whether one or more) in the line and the distance from zero to pointer 17 represents the sum of the thick ends of the spacebands. It is manifest, therefore, that the distance between the spaceband pointers 17 and 18 represents the difference between these sums, which is the amount of expansion or expansibility of the spacebands contained in the line. Thus, when a fixed scale is employed, the space actually left in the line to be filled, when spacebands are inserted is represented by the distance between the pointer 16 and any point between pointers 17 and 18; and with the use of the fixed or immovable scale the sum of the totalized width of the character matrices indicated by the matrix pointer 16 and the totalized width of the thin ends or sleeves of the spacebands indicated by pointer 18 must be mentally determined by the operator. Therefore, to enable the operator to prepare the composed matter containing the tabulated portions it is necessary for him first to calculate mentally this sum and then to subtract this from the predetermined length of line established between the adjustable abutment 33 and the zero position of the scale.

To obviate the necessity of making these mental calculations the device of the present invention has been provided to enable the operator to determine readily and expeditiously the point at which the tabulated work is to begin. To achieve this object, the present invention provides that the scale be moved in response to the operation of the minimum-thickness spaceband pointer 18 and to effect this result the spaceband pointer 18 is pivotally articulated at 34 to the movable scale 14.

The differential or proportionate movements of pointers 17 and 18 toward the left is accomplished by the following described mechanism wherein a pawl 35 coacting with a ratchet segment on member 36 is connected to a keylever 37, Fig. 1, called the space keylever, which is actuated by the space bar 38. The depression of the space bar 38 imparts through keylever 37 a downward movement to the pawl 35 and causes the ratchet member 36 to rotate one step or unit angular distance equivalent to one tooth and to be held thereat by a holding pawl 39. A corresponding movement is imparted to spaceband pointers 17 and 18 through the instrumentality of gear segments 41, 42, 43 and 44. The gearing 41 to 44 inclusive (Fig. 2) is so chosen as to impart a differential movement to pointers 17 and 18 such that each time the ratchet member 36 is stepped one tooth, pointer 18 will be moved a distance corresponding to the thickness of the thin end or sleeve of the spaceband, and pointer 17 will be moved a distance corresponding to the thick end of the spaceband.

The application of the present device to the composition of tabular matter will now be described. It will be assumed that a column of thirty and one-half keyboard "ems" in width is to be composed, comprising tabular matter eight "ems" wide at the left side of the column, analogous to portion 11, Fig. 5 and tabular matter fourteen and one-half "ems" wide at the right side of the column, analogous to portion 12, Fig. 5. The intermediate portion eight "ems" wide, analogous to portion 13, Fig. 5 is used for the item or stock designation and, as will presently appear, is the only part of the line in which spacebands are employed. The scale 14 is provided with a smooth surface upon which the graduations are etched or otherwise permanently marked so that a readily eraseable mark 45 can be made by the operator or compositor, which mark is made to designate the point where the right-hand tabulation is to begin and thus obviate the mental calculations required with the stationary scale. The scale may if desired be made of celluloid on which the graduations have been printed or otherwise marked, which material provides a surface from which pencil marks or the like may be readily erased. As is obvious, the point designating the beginning of the left hand tabular portion 11 is coincident with the beginning of the line and since this is determined by the adjustable abutment 33 no mark need be made on the scale. The only eraseable mark the operator need make relative to the left hand tabular portion is one denoting the width of that portion, which in the present example would fall on the line or graduation denoting 22½ keyboard "ems", as indicated at 46, Fig. 2.

Although the widths of the tabular portions are constant and are predetermined by the operator, and are designated by marking the scale accordingly, nevertheless, the mark designating the beginning of the right hand tabular portion 12 is so located as to allow a certain amount for justification; that is, for expansion of the spacebands. Thus, in the present example mark 45 is made on the scale, not on the graduation denoting 14½ keyboard "ems", between which point and zero represents the true width of the tabular portion, but approximately one "en" (which equals one-half "em") distance to the left of graduation 14½; approximately one "en" having been found in practice to be a sufficient minimum amount to provide for expansion of a composed line.

Having predetermined the widths of the tabulated portions of the line and marked the scale accordingly the operator proceeds to prepare the perforated tape in the usual manner, knowing that the correct tabulation of the matter being composed will be taken care of automatically. For instance, the operator perforates the tape for the first tabular portion by depressing the numeral keys and the "em" and/or "en" space keys in proper sequence until the matrix pointer 16 reaches the position shown at 46 in Fig. 2, it being noted that no spacebands have as yet been inserted in the line; for example, assuming that the first quotation in the table shown in Fig. 5 is set up, the operator in setting up the first portion 11 would depress the keys in the following sequence, viz., "em" quad or space, 2, 0, ½, "en" quad, 1, 1, "em" quad, "en" quad, 1, decimal, zero, zero, and the matrix pointer 16 would move toward the right variable amounts determined by the key depressed at the termination of which pointer 16 would coincide with graduation 22½, as indicated at 46, Fig. 5.

Now, in setting up the next portion 13 it is observed that three spacebands will be inserted in the line, viz., one each between "Am" and "Com", "Com" and "Alco", and one after "Alco" (Fig. 5), and the pointers 17 and 18 will be moved proportionate amounts, as indicated in Fig. 4. As previously described, the pointer 17 upon each depression of the space bar 38 moves to the left a distance representative of the thickness of the thick end of the spaceband and the pointer 18 simultaneously moves a distance representative of the thickness of the thin end or sleeve of the spaceband. So, since the distance which the pointer 18 moves represents the minimum fixed thickness of a spaceband, this thickness must be added to the total of matrix widths already accumulated and this may be accomplished in either of two ways. First, in the case of the fixed or immovable scale of the prior devices, this total is effected mentally by the operator by adding to the distance which the matrix pointer 16 has travelled the distance indicated between the pointer 18 and the zero position of the scale. On the other hand, by the second method, provided by the present invention, this summation is accomplished automatically by the provision of the movable scale 14 which, as already seen, is pivotally connected to and movable with the minimum spaceband pointer 18; thus, upon each depression of the space bar 38, the pointer 18 not only moves a distance representative of the thickness of the thin end of a spaceband but also the scale 14 moves correspondingly and hence the scale moves to the left with respect to the temporarily arrested matrix pointer 16 to change the reading thereof, which in effect is equivalent to having the matrix pointer 16 advance to the right an amount representative of the minimum thickness of a spaceband, and as a desirable result the matrix pointer 16 now indicates the aggregate totalization of matrices and minimum thicknesses of spacebands. It is manifest then that each time the space bar 38 is operated the minimum spaceband pointer 18 and hence the scale 14 moves incrementally and results in a reading indicative of the aggregate thicknesses of matrices and spaceband sleeves.

Therefore, spacebands and matrices are inserted in the composed line represented by portion 13 until the matrix pointer coincides substantially with the eraseable mark 45 made by the operator, as indicated by dotted lines at 16 in Fig. 2. The condition of the indicating mechanism at this instant is clearly illustrated in Fig. 4 wherein matrix pointer 16 is shown in coincidence with mark 45, and scale 14 is indicated as having moved an amount corresponding to the movement of minimum spaceband pointer 18. The original or initial position of the scale 14 and spaceband pointers 17 and 18 is indicated by dotted lines at the right hand side of Fig. 4. When this condition occurs the operator is apprised of the fact that the composition of the right hand tabular portion 12 is to begin and that said portion must comprise only numerals and fixed spacers, as "em" and/or "en" quads, until the matrix pointer reaches a point approximately one-half "em" or one "en" distance from the zero graduation on the scale. This approximation is necessary since, as previously mentioned, one "en" space or distance has been found in practice to be sufficient for the justification of a composed line.

As will be understood the matrix pointer 16 is now located between the spaceband pointers 17 and 18 and, as previously described, the arrival of the matrix pointer at any point between pointers 17 and 18 (but not coincident with pointer 18) is indicative of the fact that the composed line is justifiable or is within the range of automatic justification by the linecasting machine.

To effect the return of pointers 16, 17 and 18 to their original or initial positions, the carriage-return or "elevator" key is depressed to operate the keylever 47 (Fig. 3). As set forth in the aforementioned copending applications, the restoration may be effected either electromagnetically, or mechanically by power driven means, key 47 acting only to initiate the operation thereof. However, to simplify the description hereof, a manually operated means has been indicated. Keylever 47 when thus operated imparts a downward movement to link 48 to cause lever 49 to rotate in a counterclockwise direction about its pivot 51 and simultaneously to impart an upward movement to link 52, which in turn rotates bell crank 53 in a counterclockwise direction about pivot 54 to cause rod 23 to move to the left against the action of spring 22 to disable the clamping effect of disc 21 upon the matrix pointer 16 and permit pointer 16 to be returned to its initial position against the adjustable abutment 33 by a spring (not shown) acting on a cord 55 (Fig. 2).

Also pivotally attached to lever 49 is the rod 56 (Figs. 2 and 3), the downward movement of which simultaneous with link 48 causes the holding pawl 39 (Fig. 2) to be rotated in a counterclockwise direction against the action of spring 57 out of engagement with ratchet 36 and simultaneously to coact with extension 58 of pawl 35 to effect the disengagement thereof against the urge of spring 59. The ratchet 36 thus is free to respond to the pull of spring 61 to be returned in a counterclockwise direction to its initial position, at the same time effecting the return of pointers 17 and 18 to their initial position against the adjustable stop 62. It is obvious, therefore, that upon the completion of a line of composition the "elevator" key is depressed which through keylever 47 effects simultaneously the return of not only the matrix pointer 16 but also the spaceband pointers 17 and 18 to their initial or "beginning-of-line" positions.

It is apparent from the foregoing description that a device has been provided which greatly simplifies and renders expeditious the work of preparing tabular matter. Although the present invention has been disclosed in connection with a keyboard perforator and counter, it is, of course, understood that the invention is capable of embodiment in many and varied applications other than that specifically disclosed without departure from the spirit and scope of the invention as defined in the appended claims.

What is claimed is:

1. In an apparatus for preparing tapes for the automatic control of line-casting machines, means for indicating amounts representative of matrix widths, means to indicate the justifiability of the line of composed matter, and means responsive to the movement of said second mentioned means for effecting a relative movement between said first and second mentioned means to change the normal zero position of justifiability.

2. In an apparatus for preparing tapes for the automatic control of line-casting machines, a scale, a pointer movable with respect to said scale in amounts representative of matrix widths, means cooperating with said pointer to indicate the justifiability of the line of composed matter, and means responsive to the movement of said means for shifting the scale to change its zero position.

3. In combination with apparatus for the production of perforated tape representing justifiable lines of matrices, a scale, a member movable under certain operating conditions for totalizing the incremental widths of matrices, a pair of members operable differentially under other operating conditions, and means controlled by one of said pair of members to effect a change in the zero position of said scale in response to each operation of said pair.

4. In a keyboard device, a plurality of members movable under different operating conditions, a scale, a series of keys corresponding to a series of characters, one of said members operated upon the depression of each of said keys an amount predetermined by the particular key depressed, a special key, means actuated by said special key for controlling the movement of the others of said members differentially according to the number of times said special key is depressed, and means controlled by one of said differentially operated members to effect a change in the zero position of said scale.

5. In combination with a keyboard perforator suitable for the production of perforated tape representing lines of composition, a scale, a member movable with respect to said scale under certain operating conditions, a pair of members operable under other operating conditions, and means responsive to the movement of one of said pair of members to cause the movement of said scale counter to the movement of said first mentioned member to effect continuously the totalization of all the fixed elements in the line of composition.

6. In a keyboard device for the production of perforated tape representing justifiable lines of matrices, a scale, a matrix pointer movable with respect to said scale in incremental amounts, a pair of pointers operable differentially to indicate a condition of justifiability, and means responsive to the movement of one of said pair of members to cause the movement of said scale counter to the movement of said matrix pointer to indicate continuously and simultaneously the totalization of all the elements of fixed thickness in the line as well as the amount of expansibility of the justifying matrices.

7. In a keyboard device, a series of keys, an indicating mechanism comprising a scale and a plurality of members relatively movable therewith, said scale comprising a fixed portion and a movable portion slidably connected to said fixed portion, means for operating one of said members variably in accordance with the keys depressed, a special key, means for operating the others of said members differentially for each effectiveness of said special key, and means controlled by one of said differentially operated members to effect a corresponding movement in said movable portion.

8. In an apparatus for preparing tapes for the automatic control of line-casting machines, a scale, a pointer movable with respect to said scale in amounts representative of matrix widths, means cooperating with said pointer to indicate the justifiability of the line of composed matter, means responsive to the movement of said means for shifting the scale to change its zero position, and means to control the return simultaneously of said pointer and all of said means to their initial positions.

9. In a keyboard device for the production of perforated tape representing justifiable lines of matrices, means operable under certain operating conditions for totalizing the incremental widths of matrices, means for totalizing the incremental expansibilities of word spacers, and means controlled by said latter means to indicate directly the combined effect of said totalizations.

10. In a keyboard device, a plurality of members, a scale, a series of keys corresponding to a series of characters, one of said members movable relatively to said scale in accordance with the operation of said keys for indicating a condition denoting the cumulative widths of characters, a special key, the others of said members movable simultaneously and in proportionate amounts in response to the operation of said special key for indicating a different condition, and means associated with one of said other members to move said scale to indicate directly the combined effect of said conditions.

11. In a keyboard device, a plurality of members movable under different operating conditions, a scale, a series of keys corresponding to a series of characters, one of said members operated upon the depression of each of said keys an amount predetermined by the particular key depressed, a space key, mechanism operative step-by-step upon operation of the space key for controlling the movement of the others of said members differentially according to the number of times said space key is operated for indicating the justifiability of a line, and means controlled by one of said differentially operated members to effect a change in the zero position of said scale.

12. In a keyboard device, a plurality of members movable under different operating conditions, a scale, a series of keys corresponding to a series of characters, one of said members operated upon the depression of each of said keys an amount predetermined by the particular key depressed, a space key, differential gearing driven from a common source of power for controlling the movement of the others of said members proportionally according to the number of times said space key is operated for indicating the justifiability of a line, and means controlled by one of said proportionally operated members to effect a change in the zero position of said scale.

13. In combination with a keyboard device suitable for the production of perforated tape representative of consecutive characters and word spacers, a series of keys, a scale, a pointer movable variably with respect to said scale in response to the operation of said keys to indicate the cumulative widths of characters, a pair of pointers, means for operating said pointers differentially to indicate the cumulative expansibility of the word spacers, a special key, said key when operated adapted to effect a relative change in said pointers to correspond to the increment of expansibility provided by a spacer, and means controlled by one of said pair of pointers to effect a change in the zero position of said scale.

14. In an apparatus for preparing tape representing lines of composition, a scale, a pointer movable with respect to said scale in amounts representative of matrix widths, means cooperating with said pointer to indicate the justifiability of the line of composed matter, and means responsive to the movement of said means for shifting the scale counter to the movement of said pointer to superadd to the matrix width indication other widths of fixed dimension.

15. In a keyboard device suitable for the production of perforated tape representing lines of composition, a series of keys, an indicating mechanism comprising a scale and a plurality of members relatively movable therewith, said scale comprising a sectoral portion and an arcuate portion slidably connected to said sectoral portion, one of said members movable with respect to said arcuate portion in incremental amounts, the others of said members cooperating with said pointer to indicate the justifiability of the line of composed matter, and means responsive to one of said other members for shifting said arcuate portion counter to the movement of said one of said members to effect continuously the totalization of all of the fixed elements in the line of composition.

16. In a scale mechanism, a key controlled, indicating means movable under certain operating conditions, means responsive to other operations for indicating a different condition, and means responsive to the movement of said last mentioned means for moving the scale counter to said first mentioned indicating means.

17. In an apparatus for producing perforated strips, the combination of a plurality of punches, a keyboard controlling the operation thereof and comprising regular character keys and a space key, an indicator controlled by said keys and comprising a matrix pointer and a pair of spaceband pointers movable in a direction opposite to the direction of movement of the matrix pointer, said matrix pointer actuated by the character keys and the other pointers by the space key, and a graduated scale coactively engaged to one of said other pointers adapted thereby to move counter to said matrix pointer to change the normal zero position of justifiability.

18. In an apparatus for preparing tape representing lines of composition, a scale, indicating means movable under certain operating conditions in amounts representative of matrix widths, means movable in response to other operations for indicating a different condition, and means responsive to the movement of said last mentioned means for moving the scale in a manner which is counter to said first mentioned indicating means.

WALTER W. MOREY.